(12) United States Patent
Adel-Vu et al.

(10) Patent No.: US 11,687,725 B2
(45) Date of Patent: Jun. 27, 2023

(54) COMPUTER-IMPLEMENTED METHOD AND DEVICE FOR PROCESSING DATA

(71) Applicant: Robert Bosch GmbH, Stuttgart (DE)

(72) Inventors: Heike Adel-Vu, Stuttgart (DE); Jannik Stroetgen, Karlsruhe (DE); Lukas Lange, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 268 days.

(21) Appl. No.: 17/076,707

(22) Filed: Oct. 21, 2020

(65) Prior Publication Data

US 2021/0124877 A1 Apr. 29, 2021

(30) Foreign Application Priority Data

Oct. 29, 2019 (EP) ..................................... 19205976

(51) Int. Cl.
| | | |
|---|---|---|
| G06F 40/30 | (2020.01) | |
| G06F 16/36 | (2019.01) | |
| G06F 16/35 | (2019.01) | |
| G06F 40/253 | (2020.01) | |
| G06F 40/279 | (2020.01) | |
| G06N 5/02 | (2023.01) | |

(52) U.S. Cl.
CPC ............ *G06F 40/30* (2020.01); *G06F 16/355* (2019.01); *G06F 16/367* (2019.01); *G06F 40/253* (2020.01); *G06F 40/279* (2020.01); *G06N 5/02* (2013.01)

(58) Field of Classification Search
CPC ...... G06F 40/30; G06F 16/355; G06F 16/367; G06F 40/253; G06F 40/279; G06F 16/3347; G06F 16/353; G06F 40/295; G06F 40/216; G06F 40/284; G06N 5/02; G06N 3/0455; G06N 5/022; G06N 7/005; G06N 3/08

See application file for complete search history.

(56) References Cited

U.S. PATENT DOCUMENTS 10,482,118 B2 * 11/2019 Zheng .................... G06N 20/00
2020/0387570 A1 * 12/2020 Biswas ................... G06F 40/30

OTHER PUBLICATIONS

Mittal, Thinking, Fast and Slow: Combining vector spaces and knowledge graphs, https://arxiv.org/abs/1708.03310, Aug. 21, 2017 (Year: 2017).*

Yang et al., Hierarchical Attention Networks for Document Classification, Proceedings of NAACL-HLT 2016, San Diego, California, Jun. 12-17, 2016, pp. 1480-1489 (Year: 2016).*

(Continued)

*Primary Examiner* — Linda Wong

(74) *Attorney, Agent, or Firm* — Norton Rose Fulbright US LLP; Gerard Messina

(57) ABSTRACT

A computer-implemented method for processing text data including a multitude of text modules. In the method, a representation of the text is provided, and a model is used which predicts a classification for a respective text module of the text as a function of the representation of the text. The provision of the representation of the text includes the provision of a total word vector for a respective text module of the text. The total word vector is formed from at least two, preferably multiple word vectors, and a respective word vector being weighted as a function of properties of the respective text module.

13 Claims, 3 Drawing Sheets

(56) References Cited

OTHER PUBLICATIONS

Shahih et al, Combining Word and Character Vector Representation on Neural Machine translation, Oct. 16-17, 2019, 2019 Fourth International Conference on Informatics and Computing (ICIC), pp. 1-4 (Year: 2019).*

Crownpku.com, Weighted Word vector w.r.t, TF-IDF, Apr. 15, 2018, http://www.crownpku.com/2018/04/15/Weighted-Word-Vector-with-respect-to-TF-IDF.html, pp. 1-4 (Year: 2018).*

Ahmed, et al.: "Improving Neural Sequence Labelling Using Additional Linguistic Information", 2018 17th IEEE International Conference On Machine Learning and Applications (ICMLA), pp. 650-657, XP033502322.

Lange, et al.: "NLNDE: Enhancing Neural Sequence Taggers with Attention and Noisy Channel for Robust Pharmacological Entity Detection", Proceedings of the 5th Workshop on BioNLP Open Shared Tasks, (2019), pp. 26-32, XP055685239.

Lange, et al.: "NLNDE: The Neither-Language-Nor-Domain-Experts' Way of Spanish Medical Document De-Identification", arXiv:2007.01030v1 [cs.CL] (2019), pp. 1-8, XP055686018.

Strötgen, et al.: "Towards the Bosch Materials Science Knowledge Base", CEUR-WS.org/Vol1-0456/paper89.pdf, (2019), pp. 1-2, XP055685412.

Alan Akbik et. al.: "Contextual String Embeddings for Sequence Labeling", Proceedings of the 27th International Conference on Computational Linguistics, pp. 1638-1649, Santa Fe, New Mexico, USA, Aug. 20-26, 2018. (https://www.aclweb.org/anthology/C18-1139).

Ahmed Mahtab et. al.: "A novel neural sequence model with multiple attentions for word sense disambiguations" 2018 17th IEEE International conference on machine learning and applications (ICMLA), pp. 1-9.

Douwe Kiela et al.: "Dynamic Meta-Embeddings for Improved Sentence Representations", Cornell University Library, 2018, pp. 1-12.

* cited by examiner

COMPUTER-IMPLEMENTED METHOD AND DEVICE FOR PROCESSING DATA

CROSS REFERENCE

The present application claims the benefit under 35 U.S.C. § 119 of European Patent Application No. EP 19205976.4 filed on Oct. 29, 2019, which is expressly incorporated herein by reference in its entirety.

FIELD

The present invention relates to a computer-implemented method and to a device for processing text data including a multitude of text modules, in particular, including an artificial neural network.

BACKGROUND INFORMATION

Recurrent neural networks are used in conjunction with a Conditional Random Field Classifier (CRF), for example, for processing text data. In the process, each word of a text is represented by a distributional vector. For this purpose, concatenated word representations are used, for example, which have been trained on large volumes of unlabeled text data. One example thereof is described in Akbik, et al. 2018 "Contextual String Embeddings for Sequence Labeling," https://www.aclweb.org/anthology/C18-1139.

Ahmed Mahtab et al.: "A novel neural sequence model with multiple attentions for word sense disambiguations" 2018, 17th IEEE International conference on machine learning and applications (ICMLA), relates to the use of attention mechanisms in models for word disambiguation.

Douwe Kiela et al.: "Dynamic Meta-Embeddings for Improved Sentence Representations," arxiv.org, Cornell University Library, 2018, relates to a method for monitored learning in NLP systems.

These concatenated word representations used in the related art include disadvantageously high-dimensional vectors. This, in turn, increases the number of parameters that must be learned in order to carry out a classification based on the word representation. Furthermore, a word-dependent or context-dependent word representation is desirable.

SUMMARY

The present invention relates to a computer-implemented method for processing text data including a multitude of text modules. In accordance with an example embodiment of the present invention, a representation of the text is provided, and a model is used, which predicts a classification for a respective text module of the text as a function of the representation of the text, the provision of the representation of the text including the provision of a total word vector for a respective text module of the text, the total word vector being formed from at least two, preferably multiple word vectors, and a respective word vector being weighted as a function of properties of the respective text module.

A text module is identified preferably as a function of the model and is assigned to a class from a set of classes. A text module is, for example, a word of the text. The model classifies each word of the present text individually as belonging to a predefined set of classes, for example, persons, locations, materials, etc.

The total word vector is therefore not a concatenation of the individual word vectors but is advantageously formed as a weighted combination of the word vectors as a function of properties of the respective text module. This advantageously enables a word-dependent and/or domain-dependent weighting of the word vectors and thus offers the possibility of favoring or disregarding word vectors determined to be word-dependent and/or domain-dependent.

The model preferably includes a recurrent neural network. This model is particularly well suited for classifying.

According to one specific embodiment of the present invention, the method further includes the calculation of a weight for a respective word vector. The model includes, for example, an attention function, which is designed to weight individual word vectors of the text modules as a function of weights.

According to one specific embodiment of the present invention, a weight for a respective word vector is also calculated as a function of the respective word vector.

According to one specific embodiment of the present invention, a first property of a respective text module represents a relative frequency of the text module in the text and/or a second property of the respective text module represents a length of the text module and/or a third property of the respective text module represents a form of the text module and/or a fourth property of the respective text module represents a syntactic category of the text module. These properties are advantageously used for calculating the weight of a respective word vector.

According to one specific embodiment of the present invention, the weights of the word vectors of a total word vector are transformed into a value range between 0, 1. For example, the weights are transformed to values between 0 and 1 with the aid of the Softmax function, the values adding up to 1.

According to one specific embodiment of the present invention, a total word vector for a respective text module is formed from the sum of at least two, preferably multiple weighted word vectors. The word vectors are multiplied by their weights and added up to form the total word vector. A total weight vector is then used in the representation of the text for each text module of the text.

The present invention further relates to a method for machine learning. A model is trained to carry out the method according to the specific embodiments for automatically classifying text modules of a text as a function of the representation of the text, the representation including a total word vector for a respective text module of the text, the total word vector being formed from two, preferably multiple, word vectors, and a respective word vector being weighted as a function of properties of the respective text module.

According to one specific embodiment of the present invention, the model includes an attention function, and the method includes the training of the attention function. The attention function is designed, for example, to weight individual word vectors of the text modules as a function of weights. The model is advantageously trained based on text data to calculate an optimized weighting for the individual word vectors.

According to one specific embodiment of the present invention, the model is trained to weight a particular word vector, in particular a domain-specific word vector, for a particular text module, in particular, for a domain-specific text module, more heavily than another, in particular domain-specific, word vector.

The present invention also relates to a device for processing text data, the device including a processor and a memory for an artificial neural network, which are designed to carry out the method according to the specific embodiments of the present invention.

The present invention also relates to a device for machine learning, the device including a processor and a memory for an artificial neural network, which are designed to carry out the method according to the specific embodiments of the present invention.

The present invention further relates to a computer program, the computer program including computer-readable instructions, during the execution of which on a computer, a method runs according to the specific embodiments of the present invention.

Further specific embodiments of the present invention relate to the use of the computer-implemented method for processing text data according to the specific embodiments for automatically extracting pieces of information from text data, for example, relating to entities, in particular, persons, locations, organizations, etc. and/or relating to concepts, in particular, proteins, chemicals, materials, etc.

Further specific embodiments of the present invention relate to the use of the computer-implemented method in models for creating databases, in particular, structured knowledge databases, in particular, knowledge graphs, the method according to the specific embodiments being used to extract pieces of information from text data, and the pieces of information being used for creating databases, in particular, structured knowledge databases, in particular, knowledge graphs.

The method according to the specific embodiments of the present invention is usable for texts in various languages and from various domains.

The method according to the specific embodiments of the present invention may further also be used in the field of computer linguistics, natural language processing, in particular, in the field of syntax analysis, relation extraction, and text summarization.

Further advantageous specific embodiments result from the following description and the figures.

DETAILED DESCRIPTION OF EXAMPLE EMBODIMENTS

Figure 1:
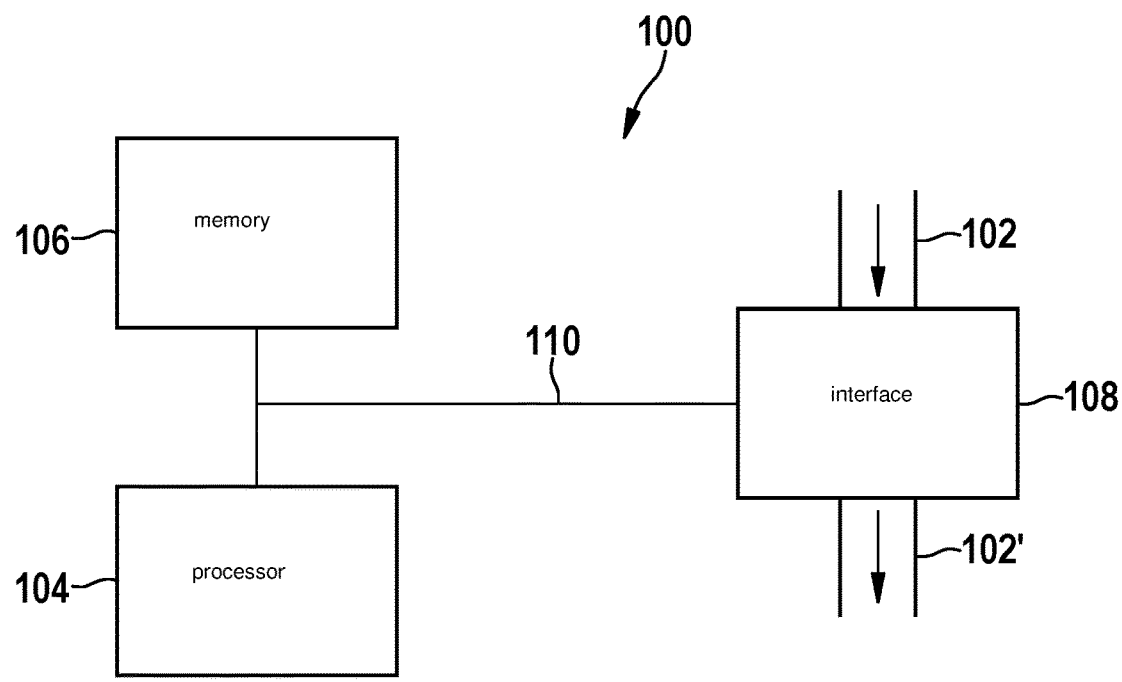
FIG. 1 schematically shows a representation of a device for processing text data, in accordance with an example embodiment of the present invention.

FIG. 1 depicts a device 100 for processing text data 102. This device 100 includes a processor 104 and a memory 106 for the model, in particular, a recurrent neural network. Device 100 in the example includes an interface 108 for an input and an output of data. Processor 104, memory 106 and interface 108 are connected via at least one data line 110, in particular, a data bus. Processor 104 and memory 106 may be integrated into a microcontroller. Device 100 may also be designed as a distributed system in a server infrastructure. These are designed to carry out the method for processing text data 102 described below with reference to FIG. 3. Data 102' resulting from the processing of text 102 as input of interface 108 are depicted in FIG. 1 as output of interface 108.

Figure 2:
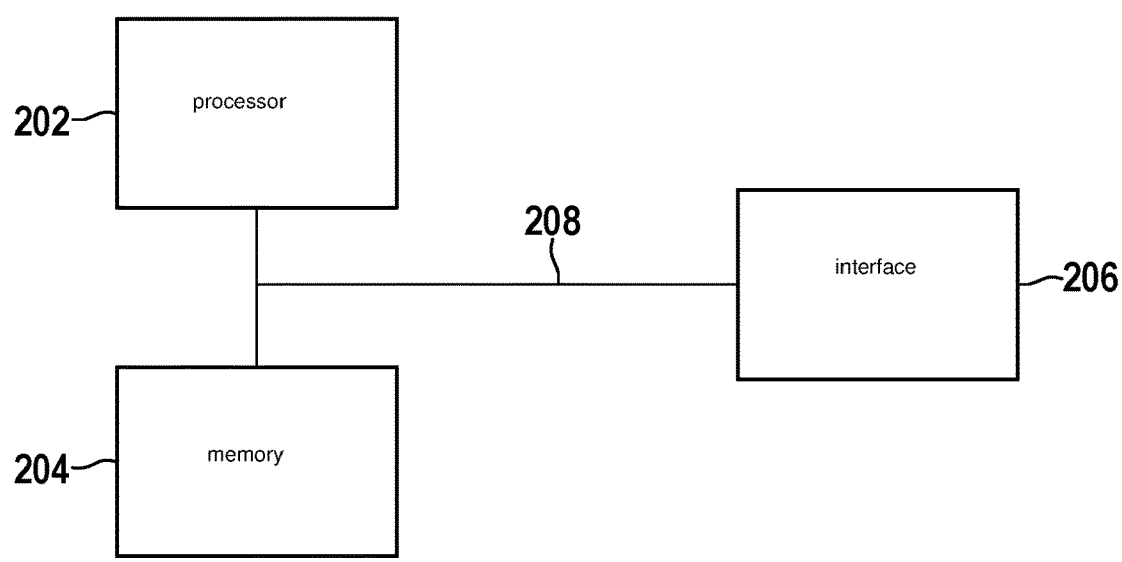
FIG. 2 schematically shows a representation of a device for machine learning, in accordance with an example embodiment of the present invention.

FIG. 2 schematically depicts a device 200 for machine learning. This device 200 includes a processor 202 and a memory 204 for the neural network. Device 200 in the example includes an interface 206 for an input and an output of data. Processor 202, memory 204 and interface 206 are connected via at least one data line 208. Device 200 may also be designed as a distributed system in a server infrastructure. These are designed to carry out the method for machine learning, which is described below with reference to FIG. 4.

Figure 3:
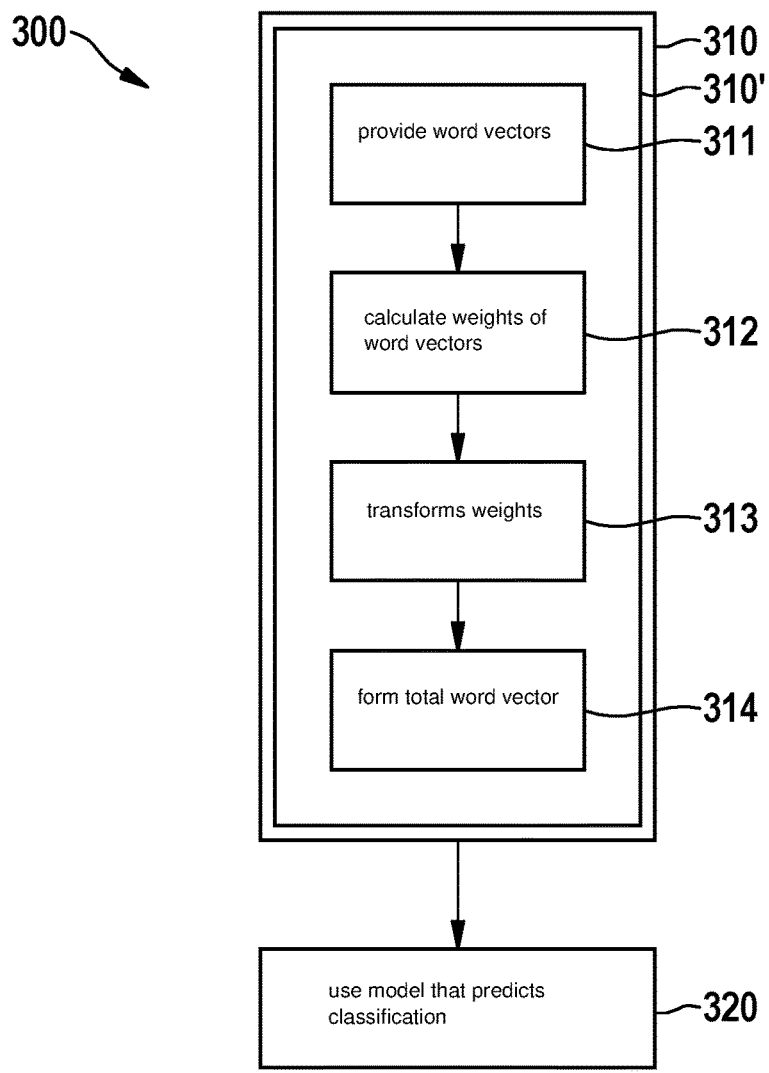
FIG. 3 shows steps of a method for processing text data, in accordance with an example embodiment of the present invention.

FIG. 3 depicts steps in a method 300 for processing text data.

Method 300 for processing text data that include a multitude of text modules, includes a step 310 for providing a representation of the text and a step 320 for using a model that predicts a classification for a respective text module of the text as a function of the representation of the text. Step 320 takes place, for example, using a Conditional Random Field Classifier (CRF).

Provision 310 of the representation of the text includes provision 310' of a total word vector for a respective text module of the text, the total word vector being formed from at least two, preferably multiple, word vectors, and a respective word vector being weighted as a function of properties of the respective text module.

A text module is preferably identified as a function of the model and assigned a class from a set of classes. A text module is, for example, a word of a text.

Provision 310' of the total word vector for a respective text module includes the following steps:

Providing 311 at least two, advantageously multiple, word vectors for a respective text module.

Provision 310' advantageously further includes the transformation of the word vectors to the same dimension, in particular, with the aid of a linear transformation.

In a further step 312, weights for the word vectors are calculated. According to the specific embodiment, a weight for a respective word vector is calculated as a function of properties of the respective text module. The model includes, for example, an attention function, which is designed to weight individual word vectors of the text module as a function of weights.

According to one specific embodiment, a first property of a respective text module represents a relative frequency of the text module in the text and/or a second property of the respective text module represents a length of the text module and/or a third property of the respective text module represents a form of the text module and/or a fourth property of the respective text module represents a syntactic category of the text module. These properties are advantageously used for calculating the weight of a respective word vector.

Different word vectors are advantageously weighted differently as a function of properties of the respective text module.

It may, for example, be advantageous to weight letter-based word vectors more heavily for text modules having a low relative frequency. This may compensate for the fact that text modules having a low relative frequency in word-based word vectors are poorly mapped or may be partially not at all detected.

It may, for example, be advantageous to weight letter-based or partial word-based word vectors more heavily for text modules having a greater length. This may compensate for the fact that longer text modules, in particular, word compounds and/or neologisms of word-based word vectors are poorly mapped or may be partially not at all detected.

A form of a text module is understood to mean a manifestation of the text module, for example, upper and lower case, the appearance of numbers and/or punctuation and/or unknown characters, in particular, Unicode characters. It may also be advantageous to weight different word vectors to different degrees as a function of the form.

A syntactic category of a text module, part-of-speech, is understood to mean a type of words of a language based on the assignment according to shared grammatical features. It may also be advantageous to weight different word vectors to different degrees as a function of the syntactic category of the text module.

According to one specific embodiment, a weight for a respective word vector is also calculated as a function of the respective word vector.

In a further step 313, the weights of the word vectors of a total word vector are transformed into a value range between 0, 1. For example, the weights are transformed with the aid of the Softmax function to values between 0 and 1, the values adding up to 1.

In a step 314, a total word vector for a respective text module is formed from the sum of at least two, preferably multiple, weighted word vectors. The word vectors are multiplied by their weights and added up to form the total word vector. A total word vector is then used in the representation of the text for each text module of the text.

The total word vector is thus not a concatenation of the individual word vectors, but is advantageously formed as a weighted combination of the word vectors as a function of properties of the respective text module. This advantageously enables a word-dependent and/or domain-dependent weighting of the word vectors, and thus offers the possibility of favoring or disregarding word vectors determined to be word-dependent and/or domain-dependent.

Based on the above-described provided representation of the text, the model predicts a classification for the individual text modules. For this purpose, the model classifies each word of the present text as belonging to a predefinable set of classes, for example, persons, locations, materials, etc.

Figure 4:
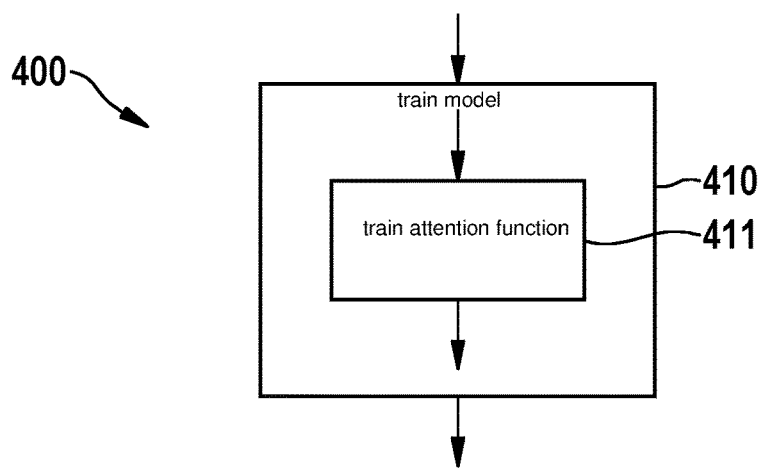
FIG. 4 shows steps of a method for machine learning, in accordance with an example embodiment of the present invention.

FIG. 4 depicts steps in a method 400 for machine learning.

Method 400 for machine learning includes training 410 of a model for carrying out the method according to the specific embodiments for automatically classifying text modules of a text as a function of the representation of the text, the representation including a total word vector for a respective text module of the text, the total word vector being formed from at least two, preferably multiple word vectors, and a respective word vector being weighted as a function of properties of the respective text module.

Method 400 includes training 411 of the attention function of the model. The attention function is designed, for example, to weight individual word vectors of the text modules as a function of weights. The model is advantageously trained based on text data to calculate an optimized weighting for the individual word vectors.

According to one specific embodiment, the model is trained to weight a particular word vector, in particular a domain-specific word vector, for a particular text module, more heavily than another, in particular, domain-nonspecific word vector.

Figure 5:
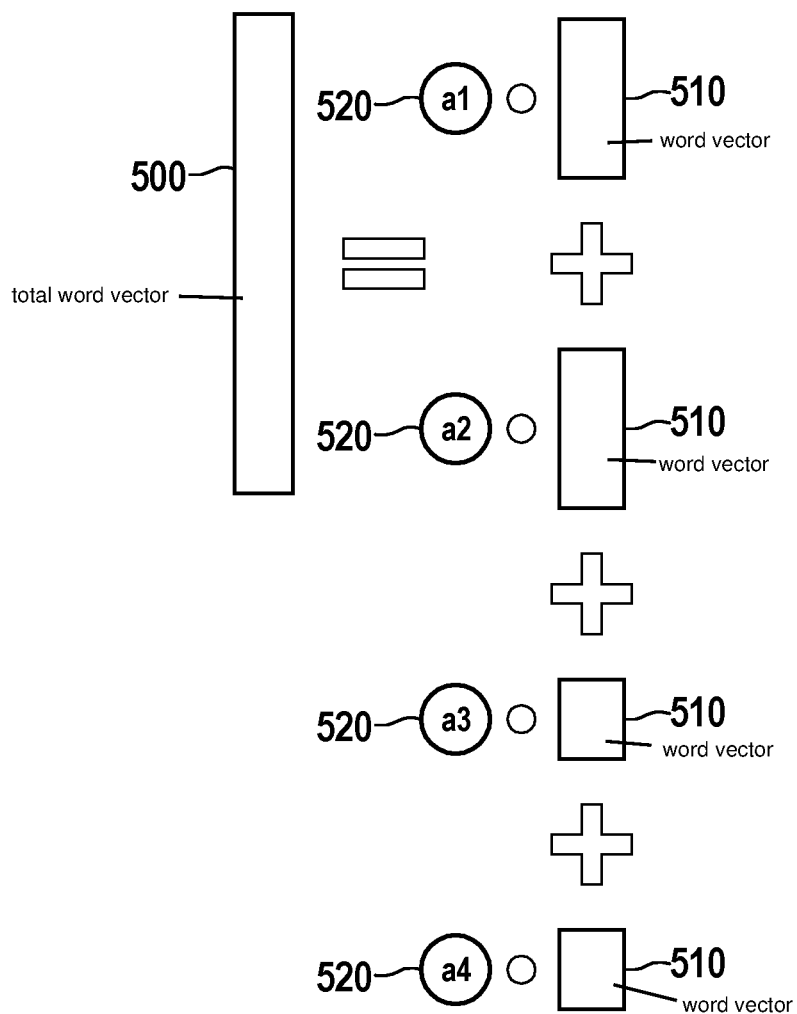
FIG. 5 schematically shows an illustration of a representation of a text module of a text, in accordance with an example embodiment of the present invention.

Finally, FIG. 5 schematically shows a representation of a total word vector 500. Total word vector 500 according to the specific embodiment depicted includes four word vectors 510, each word vector 510 being multiplied by a weight 520.

Further specific embodiments relate to the use of computer-implemented method 300 for processing text data according to the specific embodiments for automatically extracting pieces of information from text data 102, for example, relating to entities, in particular, persons, locations, organizations, etc. and/or relating to concepts, in particular, proteins, chemicals, materials, etc.

Further specific embodiments relate to the use of computer-implemented method 300 in models for creating databases, in particular, structured knowledge databases, in particular, knowledge graphs, the method according to the specific embodiments being used to extract pieces of information from text data 102, and the pieces of information being used to create databases, in particular, structured knowledge databases, in particular, knowledge graphs.

What is claimed is:

1. A computer-implemented method for processing text data, for automatically extracting pieces of information from the text data and/or in models for creating a database, the method comprising the following steps:
   receiving, at an interface, the text data, the interface connected to a processor by at least one data line;
   generating, by the processor, a representation of the text data, the text data including a plurality of words, the generating including, for each respective word of the plurality of words: generating at least two word vectors, calculating a weight for each of the at least two word vectors, and generating a total word vector as a weighted combination of the at least two word vectors according to the calculated weights, each calculated weight being a function of at least one property of the respective word in the text data;
   using, by the processor, a model to predict a classification of the text data as a function of the representation of the text data;
   generating, by the processor, the database based on the classification of the text data; and
   outputting, at the interface, the database.

2. The method as recited in claim 1, wherein the database includes a structured knowledge database or a knowledge graph.

3. The method as recited in claim 1, wherein the weight for each respective word vector is also calculated as a function of the respective word vector.

4. The method as recited in claim 1, wherein the at least one property includes at least one of: a first property representing a relative frequency of the respective word in the text data, a second property representing a length of the respective word, a third property representing a form of the respective word, or a fourth property representing a syntactic category of the respective word.

5. The method as recited in claim 1, wherein weights of the respective word vectors of the total weight vector are transformed into a value range between 0 and 1.

6. The method are recited in claim 1, wherein the total word vector for each respective word is formed from a sum of at least two weighted word vectors.

7. A computer-implemented method for machine learning, the method comprising:
   training a model for automatically classifying text data, the model being trained as a function of a representation of the text data, the text data including a plurality of words, the representation of the text data including, for each respective word of the plurality of words, a total word vector, the total word vector being generated by generating at least two word vectors for the respective word, calculating a weight for each of the at least two word vectors, and generating the total word vector as a weighted combination of the at least two word vectors according to the calculated weights, each calculated weight being a function of at least one property of the respective word in the text data;

using, by a processor, the model to predict a classification of text data to be processed;

generating, by the processor, a database based on the classification; and outputting, at an interface connected by at least one data line to the processor, the database.

8. The method as recited in claim 7, wherein the model includes an attention function and the method further includes training the attention function.

9. The method as recited in claim 8, wherein the model is trained to weight a domain-specific word vector of the at least two word vectors for a domain-specific word of the plurality of words more heavily than a domain-nonspecific word vector of the at least two word vectors.

10. A device for processing text data, the device comprising:
a processor; and
a memory for an artificial neural network; and
an interface connected to the processor by at least one data line;
the device configured to:
  receive, at the interface, the text data;
  generate, by the processor, a representation of the text data, the text data including a plurality of words, the generating including, for each respective word of the plurality of words:
  generating at least two word vectors, calculating a weight for each of the at least two word vectors, and generating a total word vector as a weighted combination of the at least two word vectors according to the calculated weights, each calculated weight being a function of at least one property of the respective word in the text data;
  use, by the processor, a model to predict a classification of the text data as a function of the representation of the text data;
  generate, by the processor, the database based on the classification of the text data; and
  output, at the interface, the database.

11. A device for machine learning, the device comprising:
a processor; and
a memory for an artificial neural network; and
an interface connected to the processor by at least one data line;
wherein the device is configured to:
  train a model for automatically classifying text data, the model being trained as a function of a representation of the text data, the text data including a plurality of words, the representation of the text data including, for each respective word of the plurality of words, a total word vector, the total word vector being generated by generating at least two word vectors for the respective word, calculating a weight for each of the at least two word vectors, and generating the total word vector as a weighted combination of the at least two word vectors according to the calculated weights, each calculated weight being a function of at least one property of the respective word in the text data;
  use, by the processor, the model to predict a classification of text data to be processed;
  generate, by the processor, a database based on the classification; and
  output, at the interface, the database.

12. A non-transitory computer-readable memory medium on which is stored a computer program, the computer program including computer-readable instructions for processing text data, for automatically extracting pieces of information from the text data and/or in models for creating a database, the instructions, when executed by a computer, causing the computer to perform the following steps:
  receiving, at an interface, the text data, the interface connected to a processor by at least one data line;
  generating, by the processor, a representation of the text data, the text data including a plurality of words, the generating including, for each respective word of the plurality of words:
  generating at least two word vectors, calculating a weight for each of the at least two word vectors, and generating a total word vector as a weighted combination of the at least two word vectors according to the calculated weights, each calculated weight being a function of at least one property of the respective word in the text data;
  using, by the processor, a model to predict a classification of the text data as a function of the representation of the text data;
  generating, by the processor, the database based on the classification of the text data; and
  outputting, at the interface, the database.

13. The method as recited in claim 1, wherein the method is used to extract pieces of information from the text data, and the pieces of information being used to create knowledge graphs.

* * * * *